Figure 1:
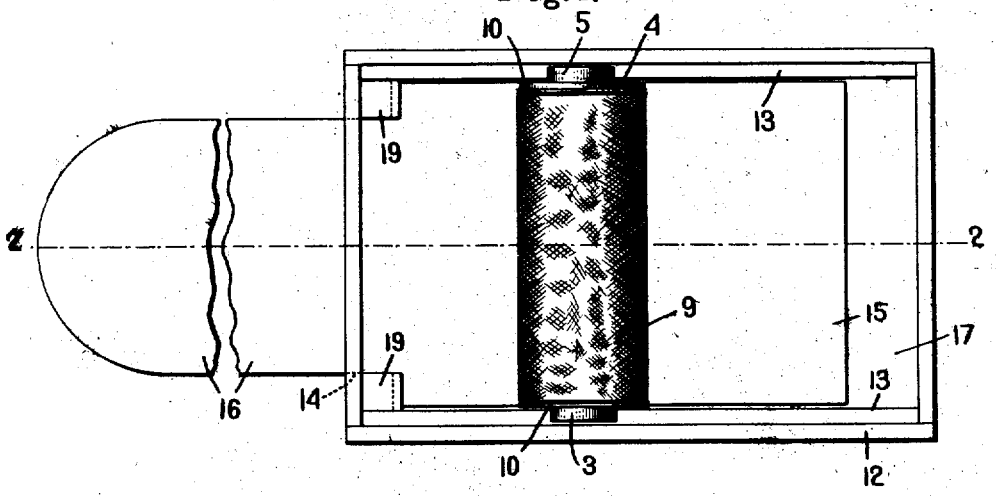

R. CROMPTON.

APPARATUS FOR DEVELOPING PHOTOGRAPHS.

APPLICATION FILED JUNE 28, 1913.

Reissued Oct. 27, 1914. 13,815.

Witnesses.
Thomas J. Drummond
Joseph D. Ashe.

Inventor.
Randolph Crompton.
by Heard Smith & Tennant.
Atty's.

UNITED STATES PATENT OFFICE.

RANDOLPH CROMPTON, OF CHATHAM, MASSACHUSETTS.

APPARATUS FOR DEVELOPING PHOTOGRAPHS.

13,815. Specification of Reissued Letters Patent. Reissued Oct. 27, 1914.

Original No. 1,057,712, dated April 1, 1913, Serial No. 721,577. Application for reissue filed June 28, 1913. Serial No. 776,451.

*To all whom it may concern:*

Be it known that I, RANDOLPH CROMPTON, a citizen of the United States, residing at Chatham, county of Barnstable, State of Massachusetts, have invented an Improvement in Apparatus for Developing Photographs, of which the following description, in connection with the accompanying drawing, is a specification, like characters on the drawing representing like parts.

This invention relates to developing photographs, whether the photograph to be developed is taken on a glass plate or a film, and hereinafter the word "plate" is used as a comprehensive term to cover plates and films, either or both, flexible or otherwise.

So far as I am aware photographs have been developed heretofore either by flowing the developing medium upon the sensitized surface of the plate, or by immersing the plate in a bath of such medium, and draining off the surplus, the operation being carried on in a dark-room, that is, one which is impervious to actinic rays. Both of these methods are objectionable, for they involve the use of a dark-room, and are open to the danger of spilling developing fluid over the clothing of the operator, or upon adjacent objects.

My present invention has for its object the production of apparatus for developing whereby the foregoing objections are obviated, the developing operation being possible at any time and without the use of complicated and cumbersome paraphernalia.

In developing photographs in accordance with my present invention I use a bag of suitable size and made of material impervious to actinic rays, and within the bag I carry on the operation of developing, and washing the sensitized surface of the plate, making use of novel apparatus in so doing. The entire process of developing is carried on inside this bag or portable dark-room, as it may be termed, consequently there is no danger of injury to the plates in course of development, or to the negatives when they are finished, from the action of actinic rays, for the negatives are washed before they are removed from the bag.

The apparatus for carrying out the process in accordance with my invention is very simple, and comprehends a holder having means to support the plate to be developed, with its sensitized surface uppermost, and means to contain and to impose successive thin sheets or films of developing medium and washing water upon such surface.

The sheet or film of liquid is imposed upon the sensitized surface of the plate by a rolling motion progressively from one to the other end of the plate.

The various novel features of my invention will be fully described in the subjoined specification and particularly pointed out in the following claims.

Figure 2:
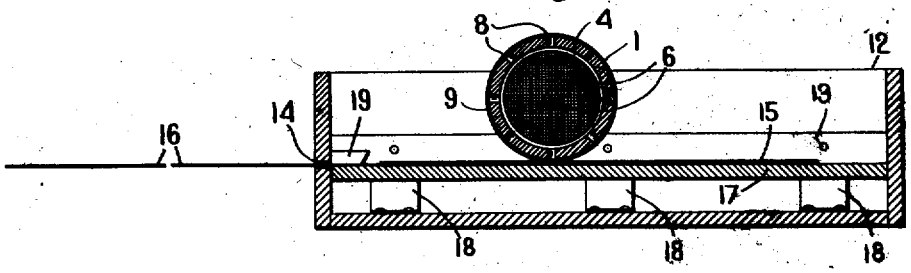
Figure 3:
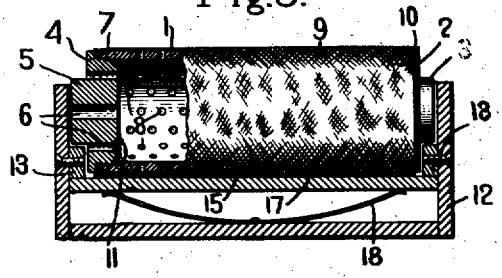

Figure 1 is a top plan view of the holder for the plate to be developed, with a film-strip in position, and showing one of the liquid carriers in readiness to impose a thin sheet or film of its liquid contents upon the sensitized surface; Fig. 2 is a longitudinal sectional view on the line 2—2 Fig. 1; Fig. 3 is a partial transverse section on the line 3—3, Fig. 2, to show more clearly the construction of the liquid carrier.

It is to be understood that while I use two carriers in carrying out my invention, one for the developing medium and another for water to wash the developed plate, the carriers are alike in construction, hence only one is shown herein, and it is necessary to describe in detail but one of them.

The bag in which I prefer to carry out the developing operations forms no part, *per se*, of the present invention, but it may be stated that it is made of suitable material impervious to actinic rays, and each of its ends is provided with a hand-opening, having an elastic band to close it tightly about the wrist of the user to exclude the light.

I will first describe the carrier, and referring to the drawing the carrier is shown as a foraminate cylinder 1, made of hard rubber or other suitable material, having a closed end 2 provided with a central projection or journal 3, the opposite end 4, also provided with a journal, as 5, having apertures 6, and having threaded engagement at 7, Fig. 3, with the open end of the cylinder.

The cylindrical wall 1 of the carrier is perforated with small holes 8, as herein shown, and said holes are staggered, in order to secure the best results. A surface covering 9 of soft and pervious, absorbent material, such as silk, is wound about the exterior of the cylindrical wall 1, and secured in place by bindings 10. The finer and closer the weave the better, so long as the pervious character is retained, the liquid with which the carrier is filled percolating through the covering and excluding therefrom in a substantially continuous surface coating, when the apparatus is in use.

The apertures 6 in the end 4 are to admit air to the interior of the carrier, in order that the contained liquid shall pass through the surface covering with the requisite freedom, and in order to prevent the liquid from flowing out through said apertures 6 I cover the end 4 with some sieve-like fabric 11, which has the capacity of allowing air to pass therethrough but of excluding the passage therethrough of liquid such as is used in developing. Said sieve-like fabric 11 thus constitutes an air-admitting but liquid-excluding means.

I have found from practice that a carrier constructed substantially as described, with the perforations in one end but with air-admitting but liquid-excluding means will hold a quantity of liquid medium which will maintain the surface of the covering 9 moist but that such medium will not ooze out or drip. This is due, I believe, to the operation of the air-admitting but liquid-excluding means which allows the air to enter the interior of the carrier so that the liquid can pass through the perforated shell thereof in sufficient quantities to keep the covering 9 saturated but not in such quantities as to cause a sufficient surplus of liquid to gather on the exterior of the carrier to collect into drops or to drip therefrom. This sieve-like fabric 11 also prevents the liquid from flowing out through the perforations in the end of the carrier.

One of the carriers so described will be charged with developing liquid, and another carrier will be filled with water, the latter to wash the developed plate, and said carriers, with the plates to be developed, and with the holder, to be described, are introduced into the bag hereinbefore referred to.

The holder, now to be described has two functions; first, to support and properly position the plate to be developed with its sensitized surface uppermost and second, to serve as a support and guide for the carrier the liquid contents of which are to be applied to such plate. Said holder is herein shown as a rectangular, open-topped box 12 of suitable material, hard rubber being very convenient, and provided on the inner faces of its opposite side wall with fixedly attached guide members 13. The upper faces of said members, which are in the same plane, support the journals 3, 5 of the carrier, and the latter can be revolved to travel endwise of the holder, from one to the other end of the guide members, the body of the carrier being interposed between the upright faces of said members, and a slight clearance is left between the ends of the carrier journals and the walls of the holder, as shown in Fig. 3.

At one end the holder has a transverse slit 14, to be used when the plate to be developed is a film strip; such as 15, the long end or tab 16 of the strip being threaded through the slit, see Figs. 1 and 2. By putting a film strip in the holder in this manner I am assured of properly seating it in position to be acted upon by the liquid in the carrier, the sensitized surface of the plate being uppermost. The plate to be developed rests flat upon a support 17, and said support is shown herein as extended beneath the guide members 13 and held against the under faces thereof by suitable leaf springs 18. The support is thus held level in operative position, and the plate to be developed is sustained thereon between the guide members 13. At each end of the slit 14, fixedly secured to the support 17, I provide a lug 19, the transverse faces of the lugs being slightly undercut, as shown in Fig. 2. When the tab 16 is threaded through the slit the adjacent end of the film 15 is brought against the undercut edges of the lugs, thereby squarely positioning the film upon the support 17 and keeping it down thereupon.

I have shown a film strip herein for the reason that amateur photographers use film strips, or films, to a much greater extent than glass plates, but if glass plates are used they will be positioned and sustained upon the support 17 in the same manner as has been described, but in such case the slit 14 is not used.

Having now described the apparatus I will explain the developing process carried out by the use of such apparatus.

One of the carriers having been filled with a liquid developing medium of any desired kind, and the other carrier with cold water, they, with the holder, are placed in the developing bag. The plates, or film-pack, as the case may be, are then put into the bag, and the hands of the operator are placed in the contractible ends of the bag. A plate or film strip is then placed in the holder in the manner previously described, the necessary manipulation being so simple that it is readily carried out by the sense of touch. The developing carrier is now placed in the holder, with its journals resting on the guide members 13, and the surface covering 9 will just contact substantially tangentially with the sensitized surface of the plate. By rocking or tilting the holder 12 the carrier will be caused to roll along the guide members and the liquid medium exuding through the covering 9 as it traverses the surface of the plate will be applied thereto in the form of a thin sheet or film. This film of liquid is applied progressively from end to end of the plate by the rolling movement of the carrier, the advancing edge of such applied film or sheet extending in a substantially continuous, straight line from side to side of the plate. The rolling action is continued for a time determined by the skill and experience of the operator, and according to the strength of the developing medium, and thereby the plate will be developed, producing a negative. After the subjection of the sensitized plate to the action of the developing medium for the proper length of time the water-carrier is substituted for the developer-carrier, and the rocking or tilting of the holder 12 is resumed. A short time suffices to wash enough of the developer from the plate so that the latter can be withdrawn safely from the bag and placed directly into the hypo-sulfite of soda bath. The temporary opening of the bag while withdrawing the developing plate will not injure those in the bag and yet to be developed, as they are in their light-tight cases. The process above described is repeated until all of the plates have been developed.

I have found that the rolling action by which the developing medium is applied to the plate results in very fine effects, for the developer is applied with absolute uniformity to all portions of the sensitized surface, and as the carrier is revoluble on a guide fixed with relation to the sensitized surface there is no variation in the action, nor can the carrier be pressed against the plate. Any pressure on the carrier, either when developing or when washing, is highly objectionable.

When the surface covering 9 contacts with the plate the liquid contained in the carrier appears to pass through the covering with the requisite speed, but only at the continuously changing tangential line of contact between such covering and the plate.

By staggering or arranging irregularly the perforations 8 in the cylindrical wall of the carrier I obviate any tendency to form lines or stripes on the negative. If the apertures were in regular lines around the cylinders 1 the development would tend to be accomplished to a greater extent along such lines than along the intervening spaces.

Various changes or modifications in details of construction and arrangement in the apparatus may be made by those skilled in the art without departing from the spirit and scope of my invention as set forth in the claims hereunto annexed.

Having fully described my invention, what I claim as new and desire to secure by Letters Patent is:

1. In apparatus for developing photographs, a holder having a support to sustain in fixed position the plate to be developed with its sensitized surface uppermost, a rotatable, cylindrical carrier having a surface-covering of absorbent material adapted to be charged with a liquid medium, and means on the holder to support the carrier with its absorbent covering in substantially tangential engagement with the plate, said means guiding and directing the carrier when it is rolled lengthwise of the plate, to impose upon the surface thereof a film of the liquid medium.

2. In apparatus for developing photographs, a holder having a support to sustain in fixed position the plate to be developed with its sensitized surface uppermost, a rotatable perforated cylindrical carrier adapted to be filled with a liquid medium and having an absorbent covering pervious to such medium, and means on the holder to support and guide the carrier and maintain the covering thereof in substantially tangential contact with the surface of the plate when said carrier is revolved and thereby moved endwise of the plate.

3. In apparatus for developing photographs, a holder having a support to sustain in fixed position the plate to be developed with its sensitized surface uppermost, a rotatable cylindrical carrier having a foraminate wall provided with a covering of textile material pervious to liquids, a removable perforated end for the carrier, whereby it may be filled with a liquid, the perforations in the end permitting the air to cause the contained liquid to exude through the covering, and means on the holder to support the carrier and permit it to be revolved to traverse the surface of the plate in tangential contact therewith.

4. In apparatus for developing photographs, a holder, a support therein to sustain in fixed position the plate to be developed with its sensitized surface uppermost, means to contain a liquid medium and to apply a film thereof with a rolling motion upon the sensitized surface of the plate, and a guide on the holder to support said means and maintain a fixed relationship between it and the plate during the film-applying movement.

5. In apparatus for developing photographs, a holder, a support therein to sustain in fixed position the plate to be developed with its sensitized surface uppermost, means to contain a liquid medium and to apply a film thereof with a rolling motion upon the sensitized surface of the plate, and guide members on the holder at opposite sides of and extended lengthwise of the plate, to support said liquid containing means and permit rotative movement thereof to apply a thin sheet or film of the liquid upon the surface of the plate.

6. In apparatus for developing photographs, a box-like holder, guides fixed upon the opposite sides thereof, a foraminate, cylindrical carrier adapted to contain a liquid medium and provided with a covering pervious to such medium, the ends of the carrier fitting between the guides, journals projecting from the ends of the carrier, to be sustained by and roll upon the upper faces of said guides, and means to support the plate to be developed with its sensitized surface in a plane substantially in tangential contact with the covering of the carrier.

7. In apparatus for developing photographs, a box-like holder, guides fixed upon the opposite sides thereof, a foraminate, cylindrical carrier adapted to contain a liquid medium and provided with a covering pervious to such medium, the ends of the carrier fitting between the guides, journals projecting from the ends of the carrier to be sustained by and roll upon the upper faces of said guides, a flat plate-support within the holder and under said guides, and means to maintain said support yieldingly in operative position against the lower faces of the guides.

8. In apparatus for developing photographs, a box-like holder, guides fixed upon the opposite sides thereof, a foraminate, cylindrical carrier adapted to contain a liquid medium and provided with a covering pervious to such medium, the ends of the carrier fitting between the guides, journals projecting from the ends of the carrier, to be sustained by and roll upon the upper faces of said guides, and yieldingly sustained means to support the plate to be developed with its sensitized surface between the guides, and in a plane substantially tangent to the covering of the rotatable carrier.

9. In apparatus for developing photographs, a tiltable holder having a support therein to sustain in fixed position the plate to be developed with its sensitized surface uppermost, and a freely revoluble cylindrical, foraminate carrier to contain a liquid medium and provided with a covering pervious thereto, to apply the liquid medium with a rolling action upon the surface of the plate progressively from end to end thereof, said holder having means to control the movement of the carrier when the holder is tilted.

10. In apparatus for developing photographs, a box-like holder having a slit in one end, means to support a film-strip with its sensitized surface uppermost, the end of the strip extending through the slit, lugs to maintain the strip seated, and positioned within the holder, a rotatable, cylindrical carrier having perforated walls and adapted to contain a liquid medium, an absorbent textile covering for the carrier, permitting the medium to exude therefrom, and guides on the holder to support and direct the carrier and permit it to be rolled lengthwise of the holder with its absorbent covering in tangential contact with the sensitized surface of the film-strip.

11. In apparatus for developing photographs, a tiltable box-like holder having an opening in one end, means to support a film-strip with its sensitized surface uppermost, the non-sensitized end of the strip extending through the opening, lugs to maintain the strip seated with its entire sensitized surface exposed from end to end, a rotatable, cylindrical carrier freely revoluble within the holder above the film-strip, having perforated walls and adapted to contain a liquid medium, and an absorbent covering for the carrier pervious to and permitting the liquid medium to exude therethrough, the revoluble movement of the carrier causing its absorbent covering to roll in tangential contact with the sensitized surface of the film-strip from one to its other end.

12. In apparatus for developing photographs, a tiltable box-like holder, means therein to support a film-strip with its sensitized surface uppermost, lugs to maintain the strip seated with the ends of the sensitized surface thereof at a predetermined distance from the adjacent ends of the holder, a rotatable, cylindrical carrier freely revoluble within the holder above the film-strip, having perforated walls and adapted to contain a liquid medium, and an absorbent covering for the carrier pervious to and permitting the liquid medium to exude therethrough, the revoluble movement of the carrier causing its absorbent covering to contact tangentially with the sensitized surface of the film-strip and roll thereupon continuously from one to the other end of such surface.

13. In apparatus for developing photographs, a tiltable holder having a support to sustain in operative position the plate to be developed with its sensitized surface uppermost, combined with a carrier freely revoluble in and lengthwise of the holder when the latter is tilted, said carrier having a cylindrical wall provided with irregularly arranged perforations and adapted to contain a liquid medium, and an absorbent covering for the perforated wall of the carrier, the medium therein being transferred by the covering when said carrier is caused to roll thereover, one end of the carrier being apertured to permit entrance of air thereinto to thereby cause the liquid medium to exude through the covering.

14. In apparatus for developing photographs, a tiltable holder having a support to sustain in operative position the plate to be developed with its sensitized surface uppermost, a rotatable carrier having a rigid, foraminate cylindrical wall adapted to be filled with a liquid medium, an absorbent covering for the carrier, pervious to such medium, and means on the holder to guide the carrier when it is rolled lengthwise of the holder by tilting thereof, with the absorbent covering in substantially tangential contact with the surface of the plate, thereby to impose upon the said surface a film of the liquid medium.

15. In apparatus for developing photographs, a holder, a support therein to sustain in operative position the plate to be developed with its sensitized surface uppermost, a device to contain a liquid medium and to apply a film thereof with a rolling motion upon the sensitized surface of the plate, and means on the holder coöperating with and guiding the said device during the film-applying movement thereof.

16. In apparatus for developing photographs, a holder, means therein to support the plate to be developed with its sensitized surface uppermost, devices mounted on the supporting means to position the plate and maintain it seated, a rotatable, cylindrical carrier having foraminate walls and adapted to contain a liquid medium, an absorbent covering for the carrier and pervious to the medium, permitting the latter to exude therefrom, and guides on the holder to support and direct the carrier and permit the same to be rolled lengthwise of the holder with the absorbent covering in tangential contact with the sensitized surface of the plate.

17. In apparatus for developing photographs, a holder having a support to sustain in operative position the plate to be developed with its sensitized surface uppermost, and means to support and guide a revoluble carrier, combined with the carrier having a cylindrical wall provided with irregularly arranged perforations and adapted to contain a liquid medium, and an absorbent covering for the perforated wall of the carrier, the medium therein being transferred by the covering to the plate when said carrier is revolved upon the supporting and guiding means.

18. In apparatus for developing photographs, a box-like holder having a slit in one end, means to support a film strip with its sensitized surface uppermost, the end of the strip extending through the slit, lugs to maintain the strip seated and positioned within the holder, and means to contain a liquid medium and apply the same with a rolling action upon the surface of the film strip progressively from end to end thereof, said means having a cylindrical surface covering pervious to the medium, said covering contacting substantially tangentially with the sensitized surface of the film-strip.

19. A device for developing photographs comprising a hollow, rotatable, cylindrical carrier having a foraminate wall provided with a covering of material pervious to liquids, said carrier being provided with air-admitting but liquid-excluding means which is operative at all times to admit air to the interior of said carrier thereby to allow the liquid therein to seep through the foraminate wall in sufficient quantities to maintain the cover saturated, while preventing the escape of the liquid from the carrier except through said foraminate wall.

20. A device for developing photographs comprising a hollow, rotatable, cylindrical carrier having a foraminate wall provided with a covering of material pervious to liquids, the end of said carrier being perforated, and continuously-operative air-admitting but liquid-excluding means within said carrier adjacent said perforated end which is adapted to admit air continuously to the interior of said carrier thereby to allow the liquid therein to seep continuously through the foraminate wall in sufficient quantities to maintain the covering saturated while preventing said liquid from being discharged through said perforated end.

21. A device for developing photographs comprising a hollow, rotatable carrier having a foraminate wall provided with a covering of material pervious to liquids the end of said carrier being perforated and a sieve-like member 11 extending across the interior of said carrier adjacent said perforated end, said sieve-like member preventing the escape of the liquid in the carrier through the perforated end while admitting air to the interior thereof.

In testimony whereof, I have signed my name to this specification in the presence of two subscribing witnesses.

RANDOLPH CROMPTON.

Witnesses:

LOUIS C. SMITH,
KATHLEEN M. SCOTT.